United States Patent [19]

Howard

[11] 4,303,420
[45] Dec. 1, 1981

[54] AIR TREATMENT APPARATUS

[76] Inventor: Arthur G. Howard, 7711 Newport Way, Apt. D, Indianapolis, Ind. 46250

[21] Appl. No.: 111,825

[22] Filed: Jan. 14, 1980

[51] Int. Cl.³ .............................................. B01D 46/18
[52] U.S. Cl. ...................................... 55/242; 55/290; 55/302; 55/351; 55/528
[58] Field of Search ............... 210/386, 400, 401, 506; 55/242, 272, 273, 290, 302, 351, 352, 528

[56] References Cited

U.S. PATENT DOCUMENTS

| | | | |
|---|---|---|---|
| 700,858 | 5/1902 | Thomas | 55/290 |
| 2,076,305 | 4/1937 | Strindberg | 55/290 |
| 2,516,680 | 7/1950 | Culperrer | 210/400 |
| 3,307,706 | 3/1967 | Taylor | 210/506 |
| 3,332,215 | 7/1967 | Revell | 55/352 |
| 3,552,098 | 1/1971 | Cochran | 55/351 X |
| 3,664,095 | 5/1972 | Asker et al. | 210/506 |
| 3,834,132 | 9/1974 | Moser | 55/242 |

OTHER PUBLICATIONS

RDT Standard bulletin M 16 3T, Division of Reactor Research and Development United States Atomic Energy Commission, Oakridge Tenn. 1974.
Tentative Standards for HEPA filters, AACC designation: CS1T, American Association for Contamination Control, Boston, Mass. 1968.
Contamination Control Principles, NASA bulletin SP-5045, chapter 5, p. 15, and Fed. Std. 209a, 1966.

Primary Examiner—John Adee
Attorney, Agent, or Firm—Woodard, Weikart, Emhardt & Naughton

[57] ABSTRACT

An air treatment apparatus for removing particulate matter and contaminants from a flow stream of air includes an air inlet chamber coupled to an air inlet duct and two spaced-apart air flow chambers communicating with the air inlet chamber at a first end and with an outlet duct at their opposite end. Disposed within each air flow chamber is a continuous belt filter arranged over a plurality of drive rollers. There are two rows of drive rollers spaced apart and arranged so as to position the filter throughout virtually the entire inner cavity of each air flow chamber. Each air flow chamber includes an opening with a cleaning subsystem positioned adjacent thereto. The cleaning subsystem includes a spray nozzle disposed above the opening and an air tube positioned interior and the filter passes across and around the air tube as it passes past the opening. Particulate material and other contaminants collected by the filter from the passing flow stream of air are loosened from the surface of the filter by means of a spray mist emitted by the spray nozzle and such contaminants and particulate material are then blown off of the "dirty" surface of the filter by air jets from the air tube. The apparatus also includes means for vacuum removal of contaminants and its structure may be adapted for humidification of heating air.

27 Claims, 12 Drawing Figures

AIR TREATMENT APPARATUS

BACKGROUND OF THE INVENTION

This invention relates in general to fluid treatment apparata and in particular to air treatment equipment for use in structures and in combination with air-circulating systems. In a variety of industrial equipment and residential systems, there is a need to filter or otherwise treat a recirculating medium such as, for example, air. Heating air associated with a forced air furnace is filtered so that the air which is emitted into the structure will be of a reduced particulate content. The quality of such circulating air may also be improved by the addition of moisture. A humidifier is typically employed for such treatment either as part of the furnace or by way of a separate apparatus.

Filtering arrangements are also employed with recirculating oil or coolant in machining centers, and similar filtering of either liquids or gases is found even when the fluid flow is not recirculating. In certain applications, such as the machining centers, the desire is prevent particles such as metal chips from damaging equipment. Yet in other applications, the desire is to remove contaminants such as dust, dirt, grease aerosols, etc. so that the emitted flow is clean and more healthful.

The type of filtering arrangement employed in such systems is a function of the size and type of particulate material to be removed, the resultant cleanliness desired, the amount of particulate material as a function of volumetric flow rate and the filter replacement philosophy. When filtering particles of extremely small size (less than one micron), the mesh or knit spacing of the filter must be quite small. This may be accomplished by laminating several filter layers of a random design or by a special type of single-thickness filter paper which is effectively a weave of several layers in a random knit pattern. One such special filtering paper is referred to as HEPA (High-efficiency particulate air) paper filter and has the capability of filtering submicron particles. There is, however, one disadvantage with such a material. This material can very quickly become "clogged" when particulate volume is heavy and once this occurs, the material is then no longer effective as a filtering means. HEPA paper is typically employed in a flat filter concept and once it becomes clogged, it is replaced due in part to the fact that before now, cleaning of such material was virtually impossible. Since the rate at which such a filter becomes clogged is directly related to the size of the filter and the volumetric flow rate of the substance being filtered and the particulate content, the length of time between filter changes could be lengthened by increasing the size of the filter and the cross-sectional area of the flow. While this is not possible when the filter is disposed across a fixed area inlet or outlet, it is possible to increase the length of time between filter changes by increasing the flow area and by arranging the filtering element into a continuous loop or belt and place it over a corresponding arrangement of rollers. By a zig-zag type weave of such a continuous belt, the total surface area exposed to the flow path is greatly increased over that of a flat filter. Further, it is possible to move the continuous belt past a cleaning station and extend the life of the continuous belt even more. This type of arrangement may be found in portable humidifiers where a belt arrangement is utilized to pick up moisture from a reservoir and pass it across an outlet at which time a fan blows through the filter to dispense moisture into the air.

One disadvantage with utilizing this concept of a continuous loop or belt arrangement with HEPA paper has been the inability to clean the paper and thus, the need to somewhat frequently replace this belt. Not only does such a belt represent a considerable expense, especially in view of the necessary arrangement of rollers, but there may be extensive time involved in the loading and unloading of replacement belts. However, these time and expense problems could be greatly minimized if the HEPA paper was able to be effectively cleaned. If HEPA material could be effectively cleansed while in place in the filtering device, then its life could be extended greatly and its overall desirability significantly increased. Since water is the most common medium for cleaning, its compatibility with HEPA material is critical. Once HEPA material becomes saturated with water or a water-based cleansing agent, it is thereafter unsuitable for further filtering. Consequently, if water or a water-based substance is to be used as part of the cleansing and/or humidifying system, it must be applied or utilized with respect to the HEPA material in such a manner that it will not result in saturation of the material.

Although HEPA material does have some degree of incompatibility with water, similar concerns must be considered if other types of filtering materials are utilized. The specific type of filter employed also becomes relevant with respect to the circulating medium that is going to be treated. While HEPA material may be preferred for submicronfiltering, different filter materials may be more desirable for humidifying applications or for other chemical treatment applications. If a continuous belt or similar carrier is used to retain and convey a particular liquid which is to be added to the circulating flow of air or other fluid, there first needs to be chemical compatibility. Secondly, if chemical residues may be left cleaning means are necessary to remove these residues so that the filtering element remains at full effectiveness. Other considerations involve mass flow rates and the amount of liquid to be added to the circulating medium. All of these factors are relevant in deciding what filtering element to use and how to use it.

The invention disclosed herein provides an improved air treatment apparatus capable of air filtering as well as optionally adding moisture to the air and chemical treatment of substances in the air. In one embodiment HEPA material is utilized as the filter means and cleaning means are provided to remove contaminants from this material and thereby greatly prolong the filter life.

SUMMARY OF THE INVENTION

A fluid treatment apparatus for removing particulate matter from a flow stream according to one embodiment of the present invention comprises a housing enclosure disposed in a fluid flow stream, a continuous belt of filtering material disposed in the housing enclosure and positioned across the fluid flow stream for collecting particulate matter from the fluid flow stream, drive means for moving the continuous belt and cleaning means arranged in cooperation with the continuous belt for removing collected particulate matter from the continuous belt.

One object of the present invention is to provide an improved fluid treatment apparatus capable of air filtering, moisture adding and chemical treatment.

Other objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
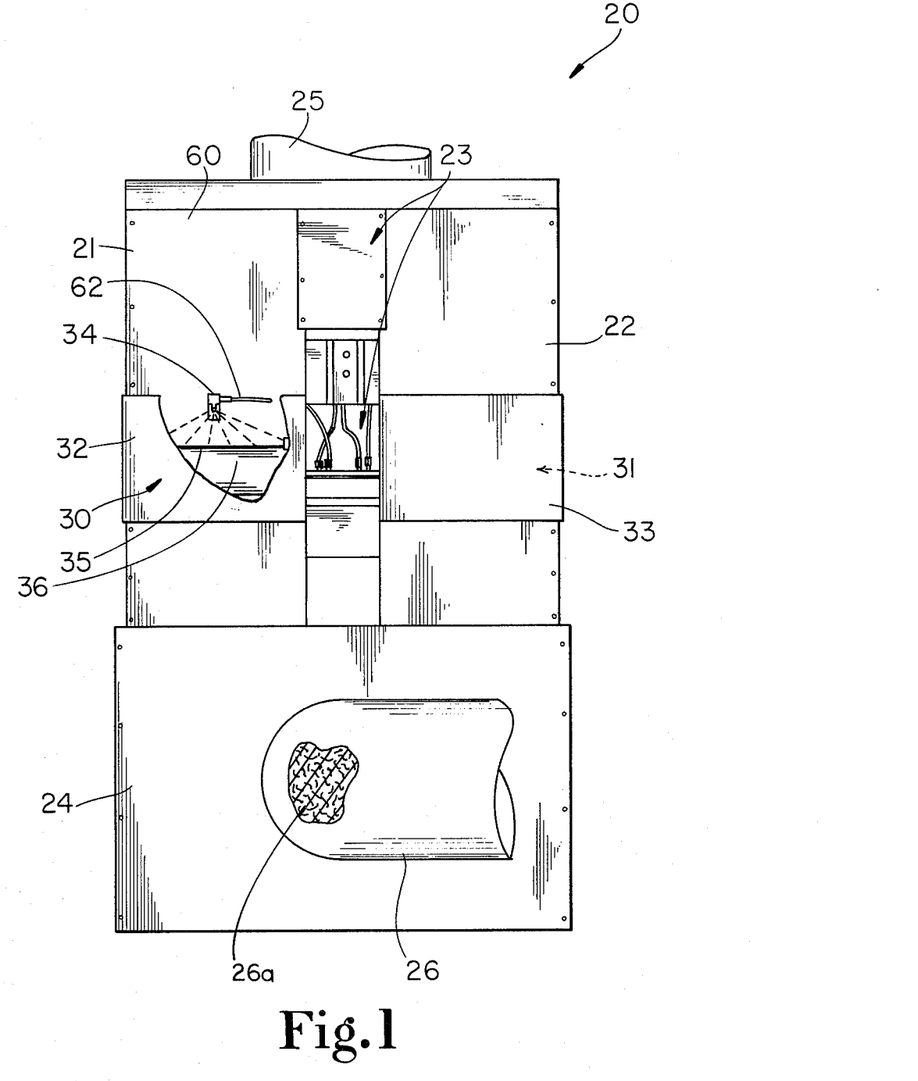
FIG. 1 is a side view of an air treatment apparatus according to a typical embodiment of the present invention.
Figure 2:
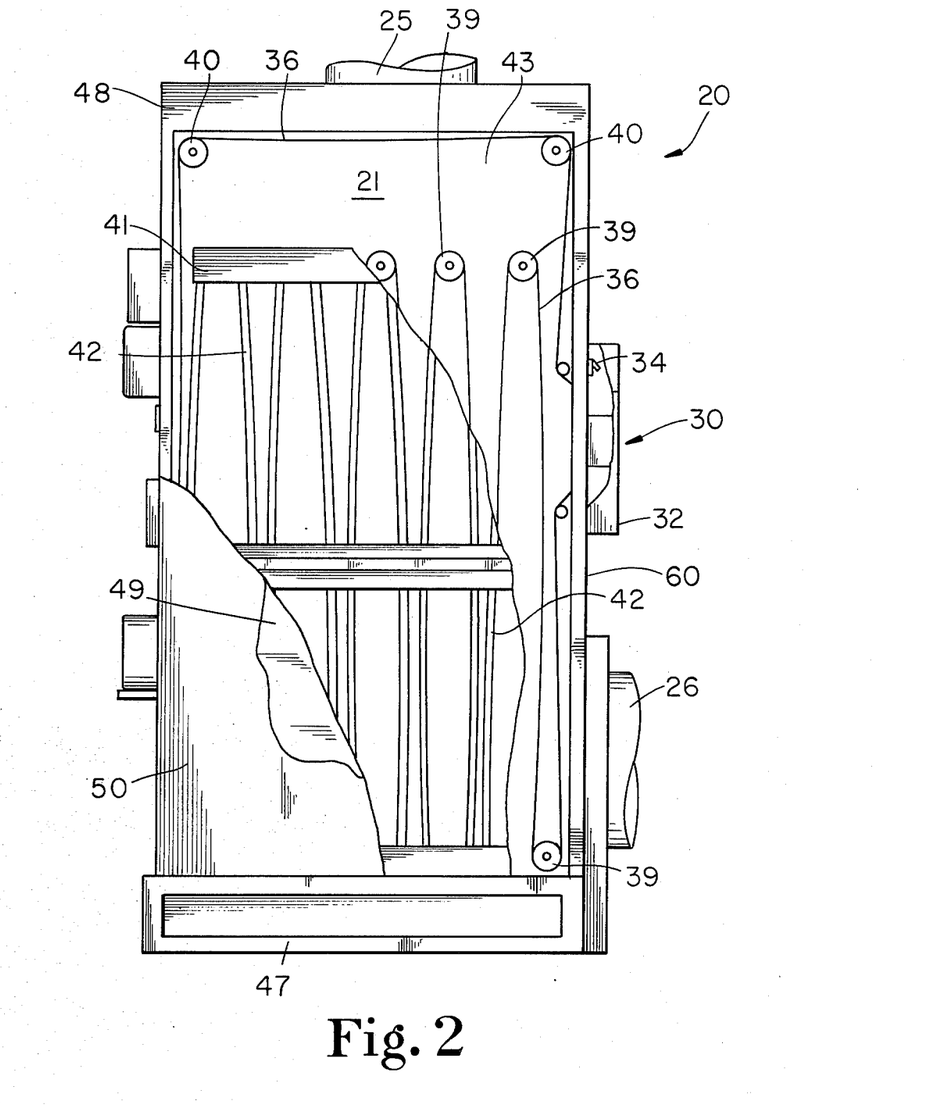
FIG. 2 is a front view of the FIG. 1 air treatment apparatus.

Referring to FIGS. 1 and 2, there is illustrated a fluid treatment apparatus 20 for removing contaminants and particulates from a circulating flow of air or other fluid, yet typically employed with circulating mixtures of a gaseous nature.

Throughout this disclosure, the term "air" will be used in conjunction with apparatus 20 only because air treatment is presently believed to be a primary application for the apparatus. However, the principles set forth and the structure described herein are equally applicable to a wide variety of circulating mediums and the term "air" is not to be treated as restrictive.

Figure 12:
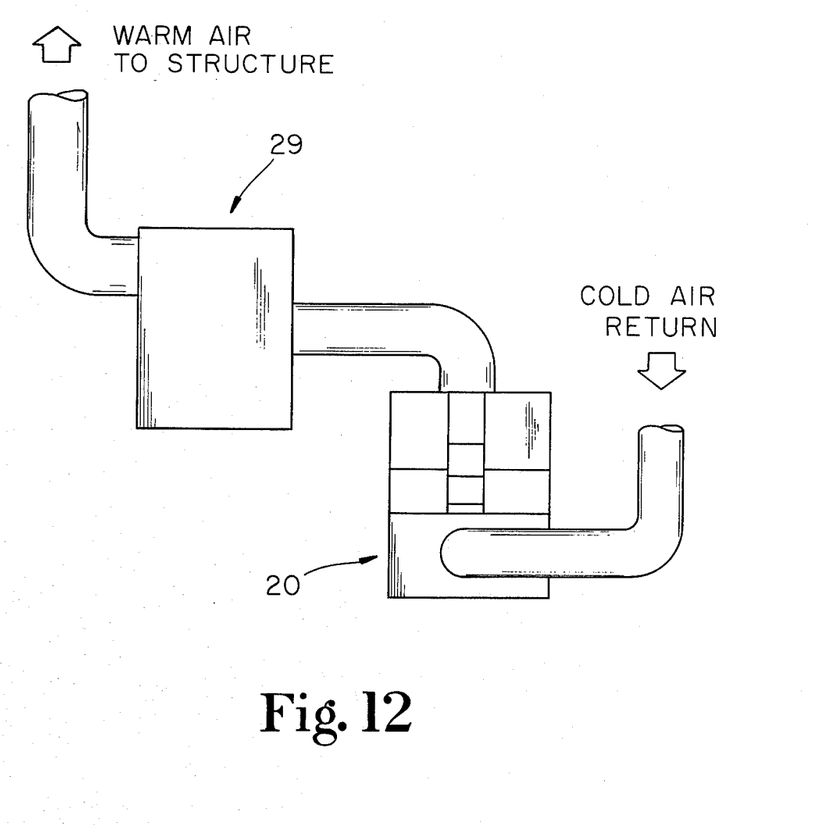
FIG. 12 is a diagrammatic view of a forced air furnace in combination with the FIG. 1 air treatment apparatus.

Apparatus 20 includes two air flow chambers 21 and 22 which are symmetrically arranged on opposite sides of control space 23. Each chamber is in flow communication with air inlet chamber 24 and air outlet duct 25. Outlet duct 25 and inlet duct 26 represent portions of an air circulation path such as that associated with a forced-air home heating system. A coarse particle filter 26a is positioned within duct 26 for removal of rough particulate matter to preclude unnecessary "loading" of the interior finer filter. FIG. 12 provides a diagrammatic representation of the position of apparatus 20 with respect to such a home heating system including furnace 29. The blower associated with furnace 29 creates a negative pressure on its inlet side and thus air flow through apparatus 20 is due in part to a suction action (negative pressure) created by this downstream blower.

Chamber 21 is virtually identical to chamber 22 and although various features of the invention may be focused on by a discussion of one chamber or the other, it is to be understood that a similar and virtually equivalent discussion and description is equally applicable to the nonmentioned chamber. The control space 23 existing between these two chambers serves a very important function. This control space provides a clearance region for the positioning of various components associated with apparatus 20 and provides space for bearing supports and the chain drive associated with the drive rollers which will be discussed in detail hereinafter. Associated with each chamber is a cleaning subsystem 30 and 31 and each cleaning subsystem is covered by box-like panels 32 and 33, respectively. As can be seen from the fragmentary presentation of subsystem 30 associated with chamber 21, a spray nozzle 34 is provided and is arranged to direct a flat and wide spray mist across opening 35 across which the continuous belt filter 36 passes. The immediate vicinity of opening 35 represents the cleaning area or zone for filter 36 and while the cleaning means remains stationary relative to the zone, the filter is moved through this zone.

In one embodiment of the present invention, continuous belt filter 36 is a continuous loop of HEPA paper which has filtering capabilities into the submicron range. This continuous belt filter is arranged over a plurality of drive rollers 39 and idle rollers 40. Rollers 40 are located in the uppermost portion of chamber 21 in order to carry the belt filter return up and over the upward lateral air flow from the drive roller exit zones. This arrangement provides unobstructed flow of cleansed air to the central plenum exit (duct 25) and thereby precludes contamination of the "clean" side of the belt filter. If additional downstream filtering is desired, such as for removal of malodors an active-charcoal filter bed can be positioned downstream from duct 25. Drive rollers 39 are arranged into two parallel rows of rollers wherein there are five rollers in the upper or top row and six staggered rollers in the lower or bottom row. The continuous belt filter is alternately wound back and forth across all of these drive rollers and the two idle rollers (this zig-zag arrangement typical for both chambers) thereby creating the continuous belt which has been described.

Figure 11:
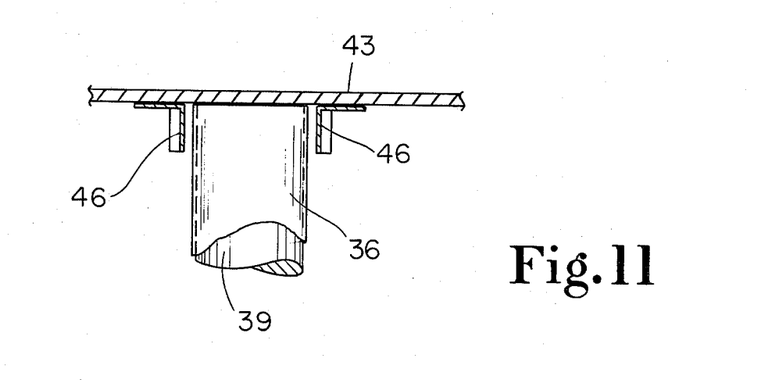
FIG. 11 is a partial plan view of a drive roller fitted within its corresponding guides.

Associated with each arrangement of drive rollers is a guide panel 41 which consists of a plurality of tracks or guides. Each guide 42 has an L-shaped lateral cross section and is positioned so as to overlap the edge of the continuous belt filter as well as extend a short distance across the surface. A similar series of guides are provided on the back surface or inner wall 43 of chamber 21 as is illustrated in FIG. 11. Referring to FIG. 11, it is shown that two L-shaped guides 46 are positioned against inner wall 43 an extend across the surface of continuous belt filter 36. Since this is a plan view, it should be understood that the filter extends into the plane of the paper as do the guides and the length of the guides is equal to the distance between the top row of rollers and the bottom row of rollers.

Figure 9:
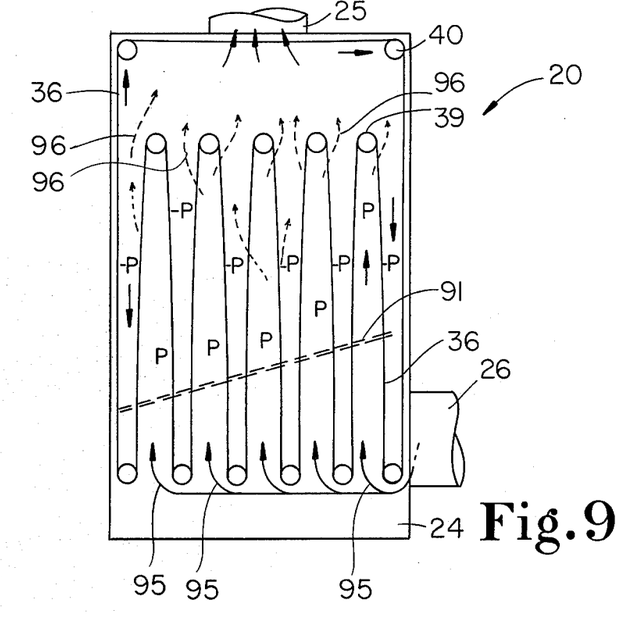
FIG. 9 is a diagrammatic front elevation view of the air flow path through the FIG. 1 air treatment apparatus.

Inasmuch as the entering air flow stream passes up through continuous belt filter, one side or surface of the filter will collect the particulate or contaminant material while the opposite side or surface will remain significantly cleaner. It should also be noted that whether air is being positively forced through or is being drawn up by means of suction from the furnace blower, the air flow passing through filter 36 will cause those portions of the filter which are strung across each pair the two sets of rollers to billow outwardly with a slight curvature. This is due merely to the slight slack existing in the continuous belt filter and the pressure acting against it. For this reason, all of the guides 42 and 46 are arranged with a compatible curvature so that when the system is in operation and the various portions have billowed outwardly, the shape of each portion corresponds with virtual identity to the curvature of the guides. Thus, the guides remain an effective means to control the path of the continuous belt filter. While the slight curvature of the guides is illustrated in FIG. 2, FIG. 9 gives a corresponding representation of the curvature existing in the various portions of the filter as it winds its way from one roller to the next roller.

Guide panel 41 is removable and since all bearing support for the various arrangements of rollers is fixed on the inner panels adjacent control space 23, it is possible to change the continuous belt filter without having to disassemble apparatus 20.

As will be explained in greater detail with respect to FIGS. 8 and 9, the incoming air flow passes upwardly through the arrangement of rollers and filter beginning within base 47 and extending upwardly to top portion 48 at which point the flow passes inwardly toward outlet duct 25. Since this incoming flow represents contaminated or otherwise dirty fluid flow and since cleaning subsystem 30 is arranged for cleansing of only one side of the filter, it is important that all particulate material extracted from the flow stream by the filter be retained on one surface of the filter. By thinking of the alternating rollers and filter as defining alternating spaces of negative and more negative pressure, it can be seen that cross-flow between adjacent spaces is very undesirable. If certain portions of the flow are allowed to pass across that surface of the filter which will not be cleaned, a reduction in filtering efficiency will result and cannot be corrected by the cleaning subsystem.

In order to seal off the various spaces from one another, a sheet 49 of plastic material, such as clear acetate, is disposed between outer panel 50 and guide panel 41. This plastic sheet extends over the full surface area of guide panel 41 and is somewhat free floating so that as suction from the furnace blower draws air upwardly and through apparatus 20, this same suction force will pull the plastic sheet 49 snugly against guide panel 41 thereby completely sealing one space from adjacent spaces so that there is no possibility of cross flow. In order to permit the free-flowing aspects of plastic sheet 49, it is arranged on outer panel 50 on clearance studs so that when the suction force occurs, there is sufficient clearance for this plastic sheet to move along the studs until such time as contact is made with guide panel 41. Alternatively, these clearance studs could be located as part of guide panel 41 and plastic sheet 49 disposed on this unit. The important aspect is though that the plastic sheet provide sufficient sealing for flow isolation between adjacent spaces.

Figure 3:
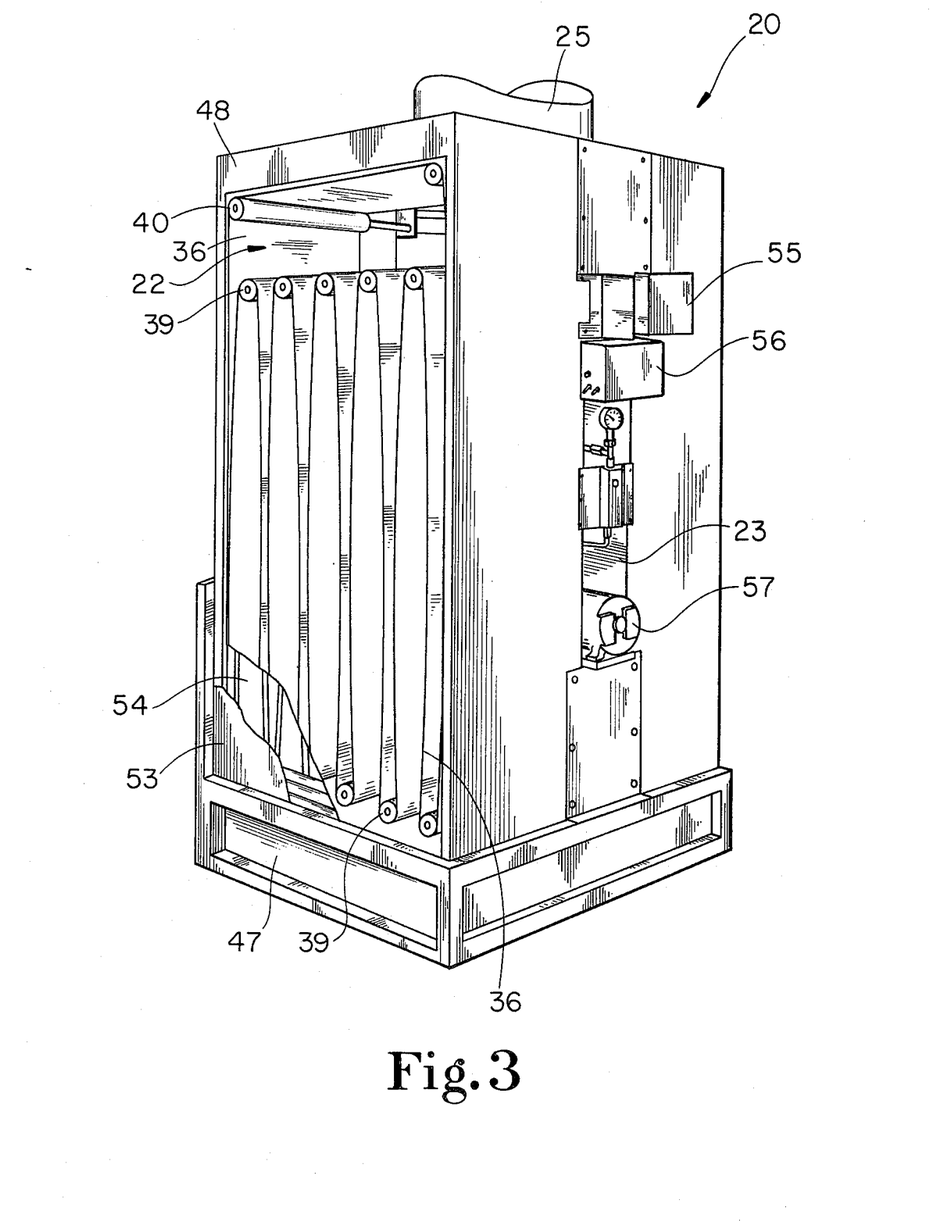
FIG. 3 is a perspective view of the FIG. 1 air treatment apparatus.

FIG. 3 is a perspective view which illustrates air flow chamber 42 and the subassemblies and components contained therein. It can be seen that chamber 22 also includes an outer panel 53, a guide panel 54 and an identical arrangement of drive rollers, idle rollers and continuous belt filter as has been described for chamber 21. Control space 23 which is disposed from one side to the opposite side between front air flow chamber 21 and rear air flow chamber 22 is defined by its two inner walls and these walls provide the bearing support locations for all the drive and idle rollers. Control space 23 between these two walls houses the sprocket and chain drive arrangement for the top set of rollers (see FIG. 10). This control space also provides a convenient means and location for the mounting of associated hardware and components necessary for the overall operation of apparatus 20. Mounted between the two air flow chambers are gear motor 55, timer mechanism 56 and an oil-less air compressor 57. It is to be understood that various other components may be included, such as various switches, gauges, interlocks, and related controls which one may wish to install with apparatus 20. Although in virtually any system gear motor 55 will be required, the remaining components depend, to a great extent, upon the nature of the cleaning subsystem employed and whether such a system is a chemical treatment system, a water-only system, an air pressure and/or vacuum system or a combination of the above. In this regard, three cleaning subsystems will be described and although such systems are believed to represent the preferred type of system for the majority of applications, such enumeration is not intended to be restrictive in any regard, it being fully understood that various options and alternatives are possible as adaptations of the basic system concepts disclosed herein.

Figure 4:
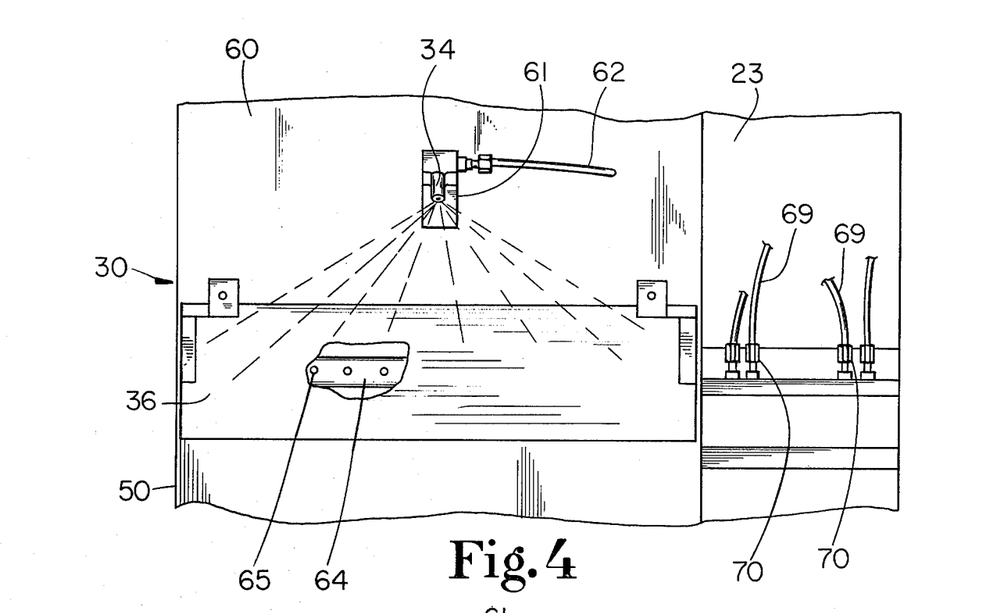
FIG. 4 is a side view detail of cleaning means comprising a portion of the FIG. 1 air treatment apparatus.
Figure 5:
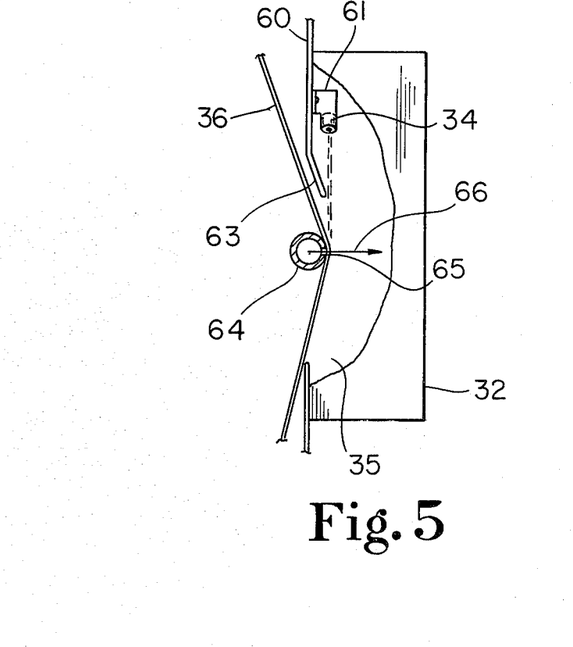
FIG. 5 is a fragmentary side elevation detail view of the FIG. 4 cleaning means.

Referring to FIGS. 4 and 5, cleaning subsystem 30 is illustrated in greater detail. This subsystem includes spray nozzle 34 which is mounted to right side panel 60 by means of bracket 61. Nozzle 34 is supplied with a selected liquid by means of tube 62 which in turn is coupled to a suitable liquid reservoir or similar source of supply and the delivery of liquid through tube 62, although it may be continuous in nature, is preferably controlled by timer mechanism 56 which typically includes a cammed arrangement to energize the liquid flow for a brief interval out of each selected time period. For example, timer mechanism 56 can be set such that liquid is supplied through spray nozzle 34 for ten seconds out of each two-minute interval. Similarly, by selection of a different timer mechanism and a different setting on the mechanism, virtually any interval of time may be selected for activation of the spray nozzle relative to any larger period of time such as four or five minutes or even longer. In fact, it is possible to arrange and select timer mechanism 56 such that the system is continuously energized for nine or ten minutes out of each 24-hour period, if the circumstances and application suggest that such a timing interval is preferred.

Right side panel 60 is arranged so as to provide a deflection lip 63 whose bottom edge defines the top edge of opening 35. Positioned within opening 35 is air tube 64 which is hollow through its entire length and provided with a plurality of uniformly spaced openings 65 which are oriented in an outwardly facing direction such that air pressure existing within tube 64 will pass through openings 65 toward filter 36 in the direction designated by arrow 66.

Air tube 64 extends for virtually the entire depth of chamber 21 from control space 23 to outer panel 50 and due to the tandem arrangement of chambers 21 and 22, a similar air tube is disposed within chamber 22. Although these two air tubes are coupled to the same source of pressurized air, separate sytems can be employed. Air input to the hollow center portion of air tube 64 is provided by tubing 69 which is attached to air tube 64 by fitting 70. The entire arrangement of air tube 64 including tubing 69 and fittings 70 is suspended within apparatus 20 in a pivotal, spring-biased fashion. By means of a suitable hinge mechanism, air tube 64 may be inwardly pivoted in order to permit ease in loading and positioning continuous belt filter 36. Once the continuous belt filter is properly oriented and in position, the manual force required to inwardly pivot air tube 64 is released thereby allowing air tube 64 to move back into its FIG. 5 orientation. It should be pointed out however that the spring force associated with air tube 64 is not excessive but merely provides a slight tension to continuous belt filter 36 and facilitates in picking up any slack which might be present so that the drive rollers will operate smoothly with respect to movement of the belt filter. It is to be understood that the position of air tube 64 with respect to the top and bottom rows of drive rollers results in a specific location relative to the length and angle of lip 63 and the location of spray nozzle 34. As the continuous belt filter leaves the right side top drive roller, it passes downwardly across air tube 64 and around the air tube toward the right side drive roller of the bottom row. By positioning air tube 64 sufficiently far to the right side of apparatus 20, a portion of filter 36 will be pushed outwardly into opening 35 thereby presenting a portion for contact with the moisture or chemical solution emitted by spray nozzle 34. The vicinity of opening 35 represents the cleaning zone and the position of air tube 64 is important relative to the movement of filter 36 through this zone.

Although spray nozzle 34 emits a very fine mist, it is not desirable that this mist contact filter 36 directly and thus lip 63 provides a deflector which shields filter 36 from a majority of direct contact by the spray mist yet that portion of the spray mist striking lip 63 will be deflected and drip down onto filter 36 near the point of contact with air tube 64. Thus, the outer surface of continuous belt filter 63, that surface which picks up the contaminant and particulate material, will be hit by a portion of the spray mist from nozzle 34 for a brief interval of time at a certain frequency rate as controlled by the timer mechanism. This fine mist spray serves to loosen those contaminants and particulate material trapped and collected by the outer surface of filter 36 and once this material is loosened, it is then capable of being blown off from the surface of filter 36 by the action of the jets of pressurized air coming through openings 65. The angle and pattern of the flat spray mist from nozzle 34 in combination with the radius arc of the belt filter as it wraps around air tube 64 causes the spray mist to strike the filter tangentially resulting in a ricocheting effect. Although surface particles are "wetted" by this effect, liquid penetration into the filter is kept to a minimum.

Spray wetting of the surface of the belt filter 36 is only required if embedded particulates are greasy or oily in nature. These types of particulates establish a bond with the filter and the use of surfactant-detergent liquids facilitate the loosening of this bond so that the air pressure (suction) process is sufficient for removal. When only dry-dusty particulates are involved, air removal alone is sufficient without spraying.

System operation of apparatus 20 is described as follows. The circulating flow of air passes up through the various spaces defined by the arrangement of rollers and only one surface of the filter collects the contaminants and particulate material. As the filter is moved via gear motor 55 and the drive rollers, this "dirty" surface passes from the top row of rollers to the bottom rows with an intermediate path across air tube 64. As the filter begins its path into the cleaning zone and across opening 35, it begins to receive some moisture from spray nozzle 34 and the contaminants gradually loosen. As this loosening action is taking place, the filter continues its travel across the outermost point of air tube 64 where openings 65 are located. By utilizing compressed air and sending pulses of such air through air tube 64, smaller, finer jets of air are emitted through openings 65 and these high pressure jets literally blow the collected contaminants and particulate material off of the "dirty" surface of filter 36 by forcing such air through the filter from the "clean" side. Those contaminants which are blown off are collected by box-like panel 32 which may then be removed and emptied periodically. Alternatively, it is possible to fit box-like panel 32 with a drain tube and thereby preclude the necessity to periodically empty this enclosure. Although the delivery of the spray mist and the jets of air pressure may be sequenced in virtually any relationship, the proximity of locations between where the spray mist contacts the filter and the air jets are positioned suggests a near simultaneous operation of these two cleansing stages.

Figure 6:
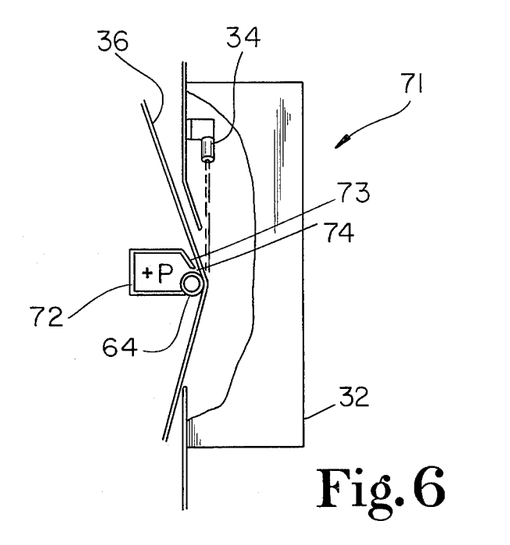
FIG. 6 is a fragmentary side elevation detail view of alternative cleaning means comprising a potion of the FIG. 1 air treatment apparatus according to a typical embodiment of the present invention.

Referring to FIG. 6, there is an alternative embodiment illustrated for the cleaning subsystem. Subsystem 71 includes all of the components and structure which have previously been described associated with cleaning subsystem 30, but additionally includes air pressure enclosure 72. Enclosure 72 represents a box-like structure extending the full length of air tube 64 and is arranged interior of air tube 64 so that air tube 64 is still able to function in part as a guide roller to permit the smooth circulation of continuous belt filter through opening 35. Enclosure 72 is sealingly joined to the lower portion of air tube 64 yet includes a top panel 73 spaced apart from the top surface of air tube 64 so as to provide an air slot 74. This air slot extends the full depth of each chamber and provides a sheet of pressurized air for the removal of contaminant material from the surface of filter 36 in a manner similar to the jets of air associated with openings 65. Thus, it is possible to either utilize enclosure 72 without utilizing pressurized air through air tube 64 or to use pressurized air both through air slot 74 and through openings 65 for a type of double action. If air pressure through tube 64 is not desired, tube 64 may be replaced with any spring-biased roller concept suitable to properly orient and move the filter through the cleaning zone. Air pressure delivery from enclosure 72 is controlled by energizing and deenergizing air compressor 57. The control of the air compressor is accomplished by a timer mechanism similar to mechanism 56. The use of enclosure 72 is preferred for those situations where additional air pressure is required and in those circumstances where a continuous sheet of air pressure is more desirable than a plurality of spaced-apart air jets. The providing of enclosure 72 also results in a more versatile overall system for it is possible to use air pressure through enclosure 72 alone or through air tube 64 alone or the combination. This enclosure also provides a more desirable structure for the vacuum system arrangement which will now be described.

Figure 7:
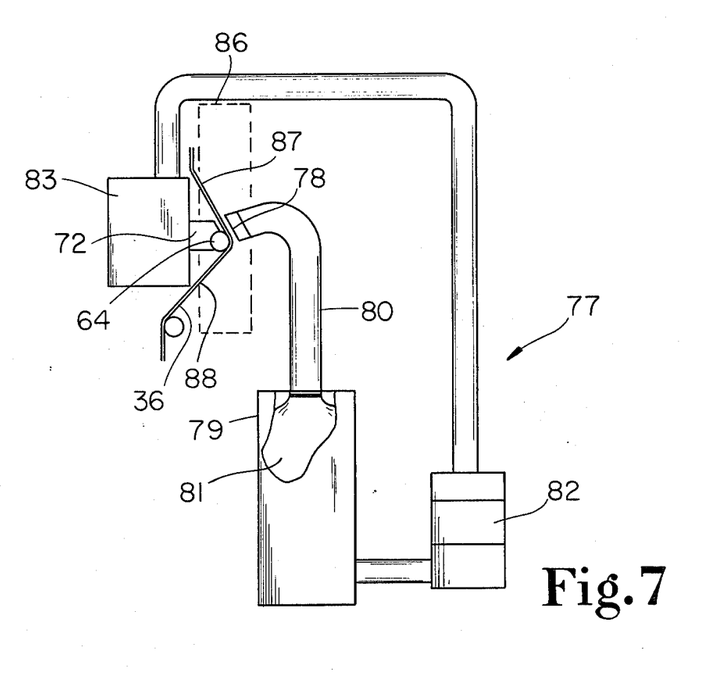
FIG. 7 is a diagrammatic view of a vacuum cleaning system in combination with the FIG. 1 air treatment apparatus.

Referring to FIG. 7, apparatus 20 and the FIG. 6 cleaning subsystem embodiment are illustrated in combination with a vacuum subsystem 77. Subsystem 77 includes a vacuum pickup head which is positioned adjacent filter 36 immediately outward of enclosure 72 and air tube 64. Head 78 is connected to cannister 79 by means of flexible conduit 80. Disposed within canister 79 is a replaceable filter bag 81 similar in concept to a vacuum cleaner bag. Cannister 79 is connected to blower 82 which in turn connects to pressure tank 83. That portion of subsystem 77 between filter 36 and the inlet side of blower 82 is in a vacuum or negative-pressure condition while that portion of subsystem 77 between the outlet side of blower 82 and the back or inner surface of filter 36 is in a positive-pressure condition. Consequently, subsystem 77 operates in a dual-stage arrangement wherein air pressure supplied by blower 82 to pressure tank 83 and enclosure 72 operates to push or blow the contaminants and particulate material from the surface of filter 36 while the remainder of subsystem 77 operates in a suction manner to pull such contaminantes and particulate material from the surface. This push and pull combination provides an extremely effective cleansing device for filter 36 and while system reliability is exceptionally high, maintenance requirements are extremely minimal. It is envisioned that the FIG. 7 vacuum system will be primarily used as an air-only system, but is also suitable for use with the spraying portion. If a spray mist is generated, additional means to separate the air and moisture will need to be included.

In order to prevent any loss of suction or pressure and thereby reduction in overall subsystem efficiency, a sealed enclosure 86 is provided around vacuum pickup head 78 and enclosure 72. Although enclosure 86 must have clearance slots 87 and 88 for the passage of filter 36 therethrough, these clearance slots are remote from the precise location where contaminants are both blown off and pulled off that any reduction in pressure due to these two slots is minimal.

Figure 8:
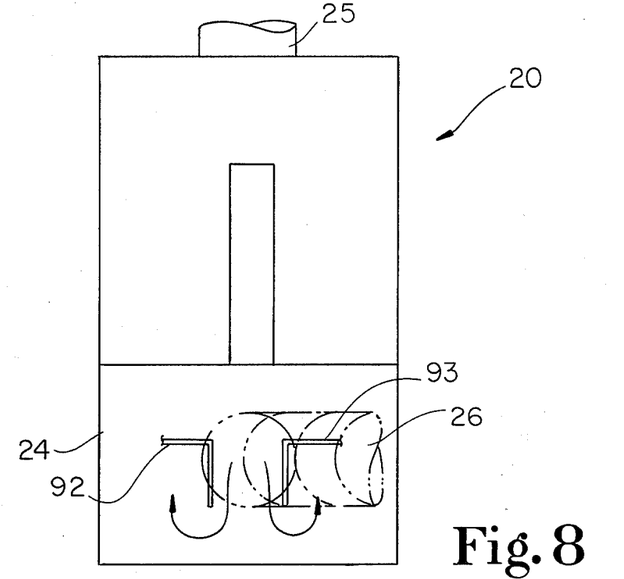
FIG. 8 is a diagrammatic side elevation view of the air flow path through the FIG. 1 air treatment apparatus.

Referring to FIGS. 8 and 9, the air flow path associated with apparatus 20 is diagrammatically illustrated. Entering air flow arrives by way of inlet duct 26 whose point of entry is centrally disposed in inlet chamber 24 between air flow chambers 21 and 22. Inlet chamber 24 is disposed with a combination of deflector plates and panels so as to close off certain portions of inlet chamber 24 from the entering air flow and thereby force such flow to pass into the lower or base portions of chambers 21 and 22. Top plate 91 extends from a first location above inlet duct 26 on the right-hand side of apparatus 20 to a second lower location adjacent the left side of apparatus 20. This top plate completely seals off the upper intermediate portions of apparatus 20 from the entering air flow. In combination with top plate 91 are side deflector plates 92 and 93 which force the entering air flow to pass downwardly before being permitted to pass toward the front and toward the rear of apparatus 20. These various plates create the incoming flow pattern which brings equal portions of the entering air into the bottom section of chamber 21 and into the bottom section of chamber 22. The inclined nature of top plate 91 permits a somewhat balanced air flow distribution into each chamber and within each chamber the flow is somewhat balanced between the left and right sides.

Consequently, the air flow, as designated by arrows 95, which passes between the various drive rollers is effectively balanced. Additional arrows are provided to show the flow direction of continuous belt filter 36 as it moves through the system. Also, it is to be understood that the various component parts associated with apparatus 20 and which are typically located within control space 23 have been omitted from FIGS. 8 and 9 as has the cleaning subsystem. Although these component parts and sybsystems do exist, their omission has been made only for the purposes of drawing clarity in that FIGS. 8 and 9 are intended to focus primarily on the air flow path. Although the interior of each chamber is of a negative pressure (suction via blower of furnace 29), certain zones are of a greater negative pressure, thus accounting for the direction of flow through the filter. P and -P indicators have been included with FIG. 9 in order to indicate the lower negative pressure and higher negative pressure surfaces of filter 36 and it should be understood that the contaminants and particulate material are collected by that surface of filter 36 defining the lower negative pressure spaces. The higher negative pressure side of filter 36 always remains interiorly facing throughout the path of filter 36. Broken line arrows 96 indicate the air flow through filter 36 and after flowing through each chamber the air flow leaves apparatus 20 by means of outlet duct 25. By the time the air flow departs each chamber, it has been cleansed of contaminants so that the exiting air is extremely clean and healthful.

Figure 10:
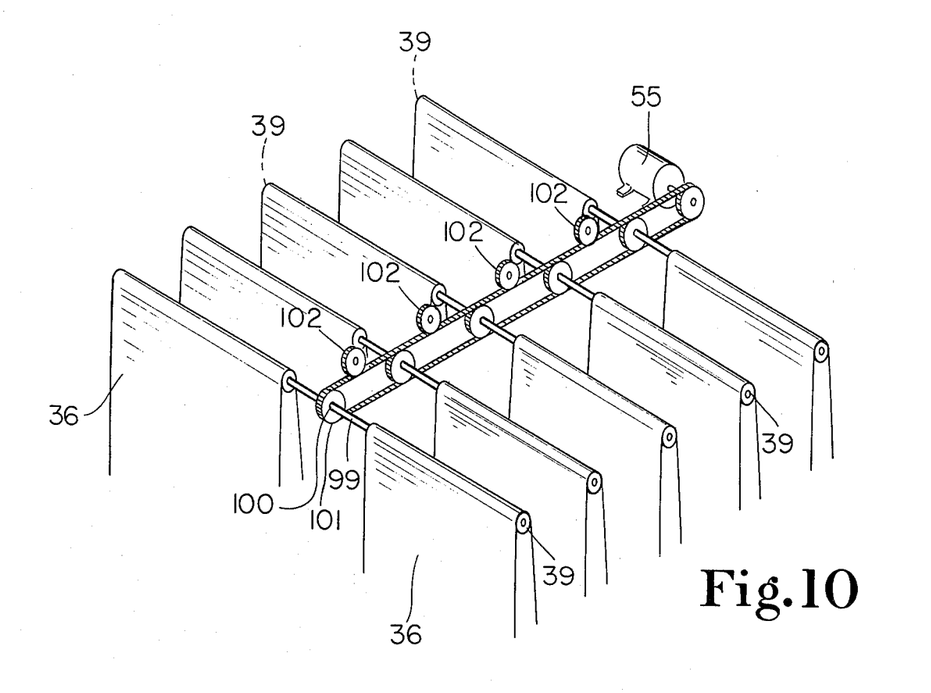
FIG. 10 is a partial perspective view of the chain drive system comprising a portion of the FIG. 1 air treatment apparatus.

As has been previously mentioned, the various drive rollers are controlled by a drive motor and chain arrangement and FIG. 10 is a partial illustration of this system. Each drive roller 39 of the top row of drive rollers in each chamber is supported on a center shaft 99 which is bearingly supported at each inner panel which provides the dividing surface between control space 23 and the corresponding two air flow chambers. Rigidly attached to each center shaft 99 is a sprocket 100 which are all identically sized and positioned. Coupling the five illustrated sprockets to gear motor 55 is a continuous length of roller chain 101. In order to maintain a positive drive system and to account for any chain elongation and dimensional variations, a plurality of idler sprockets 102 are arranged on the top surface of roller chain 101 in order to maintain proper chain tension. Although four idler sprockets are illustrated, one is sufficient for most applications. The mechanics of this drive system are readily apparent. Energizing of gear motor 55 results in movement of the roller chain and turning of the sprockets 100 which turn each shaft thereby turning the corresponding drive rollers. The preferred speed for the belt filter is approximately one inch per second. Each drive roller is approximately 15 inches in length and two inches in outside diameter. Center shaft 99 is fabricated from a length of hollow copper tubing which is press-fitted into the wood center of each driver roller. Surrounding this wood center is a synthetic coating which may be machined to its desired outside diameter size as well as provided with surface roughness or texturing to improve the frictional drag characteristic. The optimum surface texture depends upon the type of filter or belt material utilized. It is thus the tension of continuous belt filter 36 and its coefficient of friction with respect to the outer surface coating of the drive rollers that results in positive drive action of the filter. The distance between the top row of drive rollers and the bottom row is approximately 4 feet and the overall length of continuous belt filter is approximately 50 feet in each chamber. One advantage of the very large filtering surface area is that apparatus 20 can handle very large air flow volumes yet still maintain a low static pressure. A low static pressure precludes deep penetration of particulate matter into the filter thereby making cleansing easier.

Although the anticipated primary application for apparatus 20 will be in the form of air purification for business and residential forced-air heating systems, there exists virtually a myriad of other potential uses and applications with only minor component and structural modifications and/or variations. When apparatus 20 is employed as an air treatment (air purification) system, HEPA paper will typically be utilized for the continuous belt filter. HEPA paper is fabricated of chopped, short lengths of fiberglass, matted and bonded together. This paper is fabricated in various densities which governs the depth of penetration and is available from the Hollingsworth and Voss Co. of East Walpole, Mass. Due to the submicron filtering capabilities of this paper, its use as part of apparatus 20 provides a virtually unparalleled air treatment system and the novelty and uniqueness of the cleaning subsystems means that such paper can be utilized for extensive lengths of time without the need for replacement. The continuous cleaning aspects of apparatus 20 mean that filter changes will only be required when the continuous belt wears out. Further, when belt replacement is required, all that need be done is remove the outer panel and the side panel, manually release air tube 64 and load on a new belt. To facilitate this belt-changing procedure, one of the six drive rollers in the lower row of each chamber is arranged with respect to its corresponding center shaft 99 so that it can be slidably removed from the center shaft. Removal of this roller will provide more than sufficient slack for the new continuous belt filter being installed. Once such a filter is properly arranged with respect to the remaining rollers, the removed roller can then be installed back onto the center shaft. Although HEPA paper has numerous advantages due to its submicron filtering capability, the continuous belt concept is also very desirable because of the extensive surface area of filter material that is provided at any one time to the passing flow stream. If a flat sheet of HEPA filter paper was disposed perpendicular to the entering flow stream through inlet duct 26, the area of filter material versus the volumetric flow rate would result in a very rapid filter replacement requirement, or alternatively, the volumetric flow rate would have to be greatly reduced. By using the roller arrangement described, extremely high volumetric flow rates can be accommodated and the contaminant deposit per square inch of filter material can be maintained at a relatively low level and thus the circulation rate of the continuous belt can be maintained relatively low, and cleaning is fairly easy. If a much shorter belt or filter arrangement was utilized, the particulate content per square inch would be considerably higher and cleaning would be much more difficult due to the heavier concentration. By means of the super filtering capabilities of HEPA paper, a home heating system in combination with apparatus 20 is able to maintain the inside of the structure at a positive pressure. In order to achieve this very desirable result, it is necessary to provide a slight amount of outside make-up air into duct 26. This increase in air volume to the structure interior is sufficient to create a positive-pressure condition.

In the event apparatus 20 would be employed for some alternative use, such as a humidifier, in all likelihood HEPA paper would not be employed as the filtering material. Rather, a material with a greater moisture-absorption characteristic would be employed; but the concepts disclosed herein would still be applicable. Consider, for example, a spongy mesh or knit material similar to that employed in portable humidifiers. As this material passes across the cleaning subsystem location, a heavier spray of moisture is deposited while at the same time a portion of the contaminants and residues are blown off. By controlling the amount of moisture added and the amount of air pressure, significant amounts of moisture can be left in this filter material. Then, as this moisture-laden filter material passes across the various drive rollers, the incoming and upwardly passing flow of air will pick up (evaporate) extensive portions of this moisture while at the same time depositing its contaminants on the surface of this filter. Again, the advantages of a continuous belt filter enable both large volumetric flow rates of air and large amounts of moisture addition in a continuously operating self-cleaning and self-maintained system. Thus, as the outer surface of the filter becomes laden with contaminants and particulate material while also becoming dry due to the loss of moisture, it then passes back through the cleaning zone where such contaminants are blown free and additional moisture is added. Due to lime and related deposits, it is also envisioned that certain chemicals may be added to the liquid reservoir that supplies spray nozzle 34 so as to be able to clean off these various residues and deposits. It is also envisioned that certain germicides may be added to the liquid in order to more thoroughly cleanse and sanitize the air which is reintroduced into the structure.

Although apparatus 20 is configured with the necessary baffle plates to split the incoming air flow equally into the two chambers, it is envisioned that a revised orientation of baffle plates can be used to direct all the incoming flow into only one chamber. Thereafter, by closing duct 25 and placing an exit aperture in the other chamber, a two-stage apparatus can be configured with continuous flow up one chamber and down the other. A variety of cleaning concepts can be employed with this two-stage configuration.

Thus, as has been described, apparatus 20 may be utilized for air filtering, or similarly, filtering of other gaseous substances. Apparatus 20 may also be utilized as a humidifier both with or without chemical treatment of the air and may be utilized as an air filter and air cleaner with humidification. It is also envisioned that apparatus 20 may be associated with exhaust cleaning, for example, with fast-food restaurants. Exhaust from fast-food restaurants represents one of the most troubling problems in air treatment. The air which is exhausted is both grease-laden and at a relatively high temperature. Consequently, this exhaust represents a major concern because the grease becomes deposited on the exhaust stack and superstructure areas of the restaurant and poses a serious fire hazard. Furthermore, the heat loss represents significant wasted BTU's which could be utilized for heating or preheating if the grease could be effectively removed. By passing such grease-laden exhaust through prior cleaning means wherein a spray mist of strong chemical solution is administered, it is possible to emulsify the grease. Once the heavy particles are removed, the remaining grease-aerosols and smoke are introduced into apparatus 20 for further treatment. It is thus possible within the teachings of this invention and the structure of apparatus 20 to reintroduce such exhaust stack air, thoroughly cleaned, back into the structure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid treatment apparatus for removing particulate matter from a flow stream, said fluid treatment apparatus comprising:
   a housing enclosure disposed in a fluid flow stream and arranged into two, spaced-apart flow chambers which further define a clearance region therebetween, said flow chambers sharing a common inlet and a common outlet which are in flow communication with said fluid flow stream, said housing enclosure adapted to divide any entering flow into two flow branches, a different flow branch extending through each flow chamber;
   a plurality of drive shafts extending across said clearance region and into each of said flow chambers;
   a plurality of filter support rollers arranged in each flow chamber, rollers of one flow chamber being aligned with corresponding rollers of the other flow chamber, each aligned pair of rollers being supported on one of said plurality of drive shafts;
   a continuous belt of filtering material disposed in each flow chamber and arranged across the corresponding flow branch, each of said continuous belts of filtering material being cooperatively arranged over said filter support rollers;
   drive means disposed within said clearance region and coupled to said plurality of drive shafts for moving each of said continuous belts of filtering material; and
   cleaning means arranged in cooperation with said continuous belts of filtering material for removing collected particulate matter from said continuous belts of filtering material.

2. The fluid treatment apparatus of claim 1 wherein said continuous belts of filtering material are fabricated from high-efficiency particulate air filter material.

3. The fluid treatment apparatus of claim 1 wherein said cleaning means includes, exterior to each flow chamber, spraying means directed toward a cleaning zone through which cleaning zone the corresponding continuous belt of filtering material moves when said drive means is energized.

4. The fluid treatment apparatus of claim 3 wherein said cleaning means further includes an air tube having a series of openings positioned in a continuous belt-facing orientation, said air tube being located on the opposite side of said continuous belt from said spraying means and coupled to a source of pressurized air for generation of air pressure jets via said series of openings.

5. The fluid treatment apparatus of claim 4 wherein said continuous belts of filtering material are fabricated from high-efficiency particulate air filter material.

6. The fluid treatment apparatus of claim 1 wherein said cleaning means includes spray mist generating means and air jet generating means.

7. The fluid treatment apparatus of claim 6 in which said spray mist generating means is selectively operable to produce a spray mist and is arranged relative to both of said continuous belts of filtering material to direct said spray mist at a fixed location on one side of said continuous belts of filtering material.

8. The fluid treatment apparatus of claim 7 in which said air jet generating means is selectively operable to produce pressurized pulses of air and is arranged relative to both of said continuous belts of filtering material to direct said pulses at a fixed location on the other side of said continuous belts of filtering material.

9. The fluid treatment apparatus of claim 8 wherein said air jet generating means further includes a pair of air tubes, each having a spaced plurality of apertures therein and directed toward said other side of a corresponding one of said continuous belts of filtering material, each of said air tubes being in direct contact with a corresponding one of said continuous belts of filtering material.

10. The fluid treatment apparatus of claim 8 wherein said air jet generating means further includes an air pressure enclosure coupled to a source of pressurized air, said air pressure enclosure having a slit-like opening extending across and directed toward at least one of said continuous belts of filtering material.

11. The fluid treatment apparatus of claim 10 which further includes a vacuum pickup system including a pickup head disposed across from said slit-like opening, a collecting receptacle for contaminants coupled to said pickup head and a blower coupled between said collecting receptacle and said air pressure enclosure.

12. The fluid treatment apparatus of claim 11 wherein said continuous belts of filtering material are fabricated from high-efficiency particulate air filter material.

13. The fluid treatment apparatus of claim 1 wherein said cleaning means includes a push-pull vacuum system providing an air pressure stream directed at one surface of said continuous belts of filtering material and a suction force on the opposite surface directly across from said air pressure stream.

14. The fluid treatment apparatus of claim 13 wherein said push-pull vacuum system includes an air pressure enclosure having a pressure stream opening along one side for providing said air pressure stream, said push-pull vacuum system further including a vacuum pickup head adjacent said opposite surface for removal of contaminants collected by said continuous belts of filtering material.

15. The fluid treatment apparatus of claim 14 wherein said push-pull vacuum system includes a contaminant collecting receptacle coupled to said pickup head and a blower coupled between said contaminant collecting receptacle and said air pressure enclosure.

16. The fluid treatment apparatus of claim 15 wherein said continuous belts of filtering material are fabricated from high-efficiency particulate air filter material.

17. A fluid treatment apparatus for conditioning a flow stream of fluid, said fluid treatment apparatus comprising:
   a housing enclosure disposed within said flow stream and communicating therewith, said housing enclosure arranged into two, spaced-apart flow chambers which define a clearance region therebetween, said housing enclosure being further adapted to split any entering flow stream into two flow branches, a different flow branch passing through each flow chamber;

a series of drive rollers disposed in each flow chamber, drive rollers in one flow chamber being aligned with drive rollers in the other flow chamber;

a plurality of common drive shafts extending through said clearance region and into each flow chamber and being adapted to support, with one at each end, a corresponding aligned pair of drive rollers;

a continuous belt of filtering material disposed within each flow chamber and arranged across the corresponding flow branch via the corresponding drive rollers; and drive means disposed within said clearance region and cooperatively coupled to said plurality of common drive shafts for moving each continuous belt of filtering material.

18. The fluid treatment apparatus of claim 17 wherein said continuous belts of filtering material are fabricated from high-efficiency particulate air filter material.

19. The fluid treatment apparatus of claim 22 which further includes cleaning means located at a fixed position relative to each flow chamber and focused at a cleaning zone through which each corresponding continuous belt of filtering material passes when moved by said drive means.

20. The fluid treatment apparatus of claim 19 wherein said cleaning means includes a spray nozzle positioned exterior of each continuous belt of filtering material and directed toward said cleaning zone and an air stream conduit positioned interior of each continuous belt of filtering material and directed toward each cleaning zone.

21. The fluid treatment apparatus of claim 20 wherein said spray nozzle is operably coupled to a source of liquid and to control means and includes a suitably designed spray orifice for intermittently delivering a substantially flat spray mist to each cleaning zone.

22. The fluid treatment apparatus of claim 20 wherein said air stream conduit includes a pair of hollow tubular members each coupled to a source of pressurized air and including a plurality of spaced-apart air jet apertures directed toward each continuous belt of filtering material.

23. The fluid treatment apparatus of claim 22 wherein each continuous belt of filtering material is in direct contact with the exterior of a corresponding hollow tubular member.

24. The fluid treatment apparatus of claim 23 wherein said continuous belts of filtering material are fabricated from high-efficiency particulate air filter material.

25. The fluid treatment apparatus of claim 19 wherein said cleaning means includes a push-pull vacuum system comprising:
(a) an air pressure enclosure including a slit-like opening directed toward the interior surface of at least one of said continuous belts of filtering material;
(b) a vacuum head adjacent the exterior surface of said corresponding continuous belt of filtering material across from said slit-like opening;
(c) a contaminant collection receptacle coupled to said vacuum head; and
(d) a blower coupled between said contaminant collection receptacle and said air pressure enclosure for creating a push force at the interior surface and a pull force at the exterior surface of that portion of said corresponding continuous belt of filtering material which is located in said corresponding cleaning zone.

26. The fluid treatment apparatus of claim 25 wherein said continuous belts of filtering material are fabricated from high-efficiency particulate air filter material.

27. A fluid treatment apparatus for removing particulate matter from a flow stream, said fluid treatment apparatus comprising:

a housing enclosure having a single inlet plenum, a single outlet plenum and two, spaced-apart flow chambers positioned therebetween and in flow communication with said two plenums and further defining a clearance region between said two flow chambers, said housing enclosure being adapted to split any incoming flow into two flow branches, a different one of said flow branches extending through each flow chamber from inlet plenum to outlet plenum;

a separate filtering subsystem disposed within each flow chamber and comprising:
(a) a series of spaced-apart drive rollers;
(b) a continuous belt of filtering material disposed around said series of spaced-apart drive rollers; and
(c) a plurality of drive shafts spanning said clearance region and cooperatively coupled at one end to drive rollers of one flow chamber and at the opposite end to aligned drive rollers of the other flow chamber; and drive means disposed between said two, spaced-apart flow chambers and cooperatively coupled to said plurality of drive shafts and operable for moving each continuous belt of filtering material.

* * * * *